US007648192B2

(12) United States Patent
Herline et al.

(10) Patent No.: US 7,648,192 B2
(45) Date of Patent: Jan. 19, 2010

(54) DOOR LATCH SYSTEM FOR AUTOMOTIVE VEHICLE

(75) Inventors: Thomas Herline, Royal Oak, MI (US); Mark Brown, New Hudson, MI (US); Daniel Bejune, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 825 days.

(21) Appl. No.: 11/162,768

(22) Filed: Sep. 22, 2005

(65) Prior Publication Data

US 2007/0029835 A1 Feb. 8, 2007

Related U.S. Application Data

(60) Provisional application No. 60/704,939, filed on Aug. 2, 2005.

(51) Int. Cl.
*B60J 5/00* (2006.01)

(52) U.S. Cl. ............................. 296/187.12; 296/146.1; 292/92

(58) Field of Classification Search ............ 296/187.12, 296/187.03, 187.11, 146.1, 187.02; 292/92, 292/DIG. 65
See application file for complete search history.

(56) References Cited

U.S. PATENT DOCUMENTS

| | | | | |
|---|---|---|---|---|
| 4,911,487 | A | 3/1990 | Rachocki | |
| 4,995,654 | A * | 2/1991 | Nishigami et al. | 292/216 |
| 5,382,062 | A | 1/1995 | Kostler | |
| 5,669,642 | A | 9/1997 | Kang | |
| 5,813,709 | A | 9/1998 | Umino | |
| 5,865,481 | A * | 2/1999 | Buschmann | 292/216 |
| 6,007,122 | A | 12/1999 | Linder et al. | |
| 6,010,164 | A | 1/2000 | Yoda | |
| 6,042,159 | A * | 3/2000 | Spitzley et al. | 292/216 |
| 6,065,797 | A * | 5/2000 | Shirasaka | 296/146.6 |
| 6,070,923 | A | 6/2000 | Tanimoto et al. | |
| 6,371,538 | B1 | 4/2002 | Inoue | |
| 6,382,688 | B1 | 5/2002 | Agostini | |
| 6,428,063 | B1 | 8/2002 | Bland | |
| 6,565,134 | B1 | 5/2003 | Stuart et al. | |
| 6,648,382 | B1 | 11/2003 | Monig et al. | |
| 2003/0155780 | A1 * | 8/2003 | Bucker et al. | 292/336.3 |
| 2004/0046400 | A1 | 3/2004 | Drysdale et al. | |

OTHER PUBLICATIONS

Webster's II Dictionary Third Edition, Office Edition. © 1995 Houghton Mifflin Company. p. 357.*

* cited by examiner

*Primary Examiner*—Glenn Dayoan
*Assistant Examiner*—Melissa A Black
(74) *Attorney, Agent, or Firm*—Jerome R. Drouillard; Greg Brown

(57) ABSTRACT

A door latch system for an automotive vehicle includes a latch having a housing mounted to a door inner panel and a release lever operated by a release rod connected to a handle. An impact-responsive release lever immobilizer mounted within the door is responsive to deformation of the door in the event of an impact such that the release lever will be blocked and prevented from moving to its unlatched position.

11 Claims, 4 Drawing Sheets

DOOR LATCH SYSTEM FOR AUTOMOTIVE VEHICLE

CROSS REFERENCE TO RELATED APPLICATION(S)

The present application claims priority to U.S. Provisional Patent Application 60/704,939, filed Aug. 2, 2005.

TECHNICAL FIELD

The present invention relates to a door latch system having an impact-responsive release lever immobilizer which causes the latch to resist opening in the event of an impact directed against the door of a vehicle.

BACKGROUND

Automotive door latch systems typically use an actuation system in which a rod extends from a handle, mounted on either the outside or the inside of the door, to the latch, which allows manual unlatching of the latch so as to permit opening of the door. Undesirable unlatching may occur, however, during the event of a collision impact upon a vehicle door, if either the latch operating rod or the latch release lever is moved to the unlatched position during deformation of an outer portion of the door. Automotive designers have attempted to prevent unwanted latching in the event of an impact against a door by means of a structural cage imposed between the latch release lever or latch control rod and the outer panel of the door. In order to be effective, such protective cages must be very rigid and consequently excessive in both weight and expense. A system according to the present invention achieves the result of resisting undesired unlatching during a collision impact, but without the need for a rigid, expensive cage constructed about the latch operating rod and lever.

SUMMARY

A door latch system for an automotive vehicle includes a door having an inner panel and an outer panel, a latch having a housing mounted to the inner panel, and a release lever. The door latch system also includes a release rod operatively connected with the release lever for opening the latch, and an impact-responsive release lever immobilizer bracket mounted within the door. The immobilizer preferably includes a bracket applied to the latch housing and extending between the release rod and the outer panel of the door such that deformation of the outer panel in the region of the latch sufficient to cause the outer panel to contact the latch will cause deformation of the immobilizer bracket, thereby blocking movement of the release lever.

In one embodiment, the immobilizer bracket preferably comprises a formed member which may be configured and fastened to the latch housing so as to present a generally planar segment overlying the release rod and release lever. The immobilizer may include a first bracket portion fastened to the latch housing and a second bracket portion extending from the first portion and overlying the release rod and release lever such that an impact directed against the latch in the region of the release lever will cause the second bracket portion to deform so as to block movement of the release lever.

As an alternative, a release lever immobilizer according to the present invention may include a bracket applied to the door's outer panel and overlying the release lever such that an impact directed against the outer panel in the region of the latch sufficient to deform the outer panel will cause the bracket to contact the release lever so as to block movement of the release lever. In the case of both embodiments, the bracket has a portion interposed between the latch and operating rod and the outer door panel such that the bracket will demobilize the latch if the bracket is impacted by the outer panel.

According to another aspect of the present invention, a method for avoiding an impact-related release of an automotive door latch includes the steps of providing a latch having a housing mounted between the inner and outer panels of a door and providing a latch release lever pivotably mounted to the latch housing and having an operating path extending from a latched position to an unlatched position. The present method further includes providing a release rod attached to the latch release lever and finally, providing an immobilizer bracket mounted within the door and extending between the release lever and the outer panel of the door such than an impact directed against the outer panel in the region of the latch and having sufficient severity to deform the outer panel will cause the outer panel to deform the bracket so as to block movement of the release lever along its operating path and into the unlatched position. According to this method, the immobilizer bracket blocks movement of the release lever by moving into the path which the release lever must traverse in order to move from the latched position to the unlatched position.

It is an advantage of the present invention that a door latch system according to the present invention will withstand most unwanted unlatching during a moderate impact event against a vehicle door without the need for more costly and heavy latch armoring hardware.

It is a further advantage of the present invention that the present impact-responsive release lever immobilizer may be constructed of relatively inexpensive materials and may be applied to not only a latch housing, but also to the door outer panel. This provides additional design freedom for one wishing to employ a system according to the present invention.

Other advantages, as well as objects and features of the present invention, will become apparent to the reader of this specification.

DETAILED DESCRIPTION OF THE PREFERRED EMBODIMENTS

Figure 1:
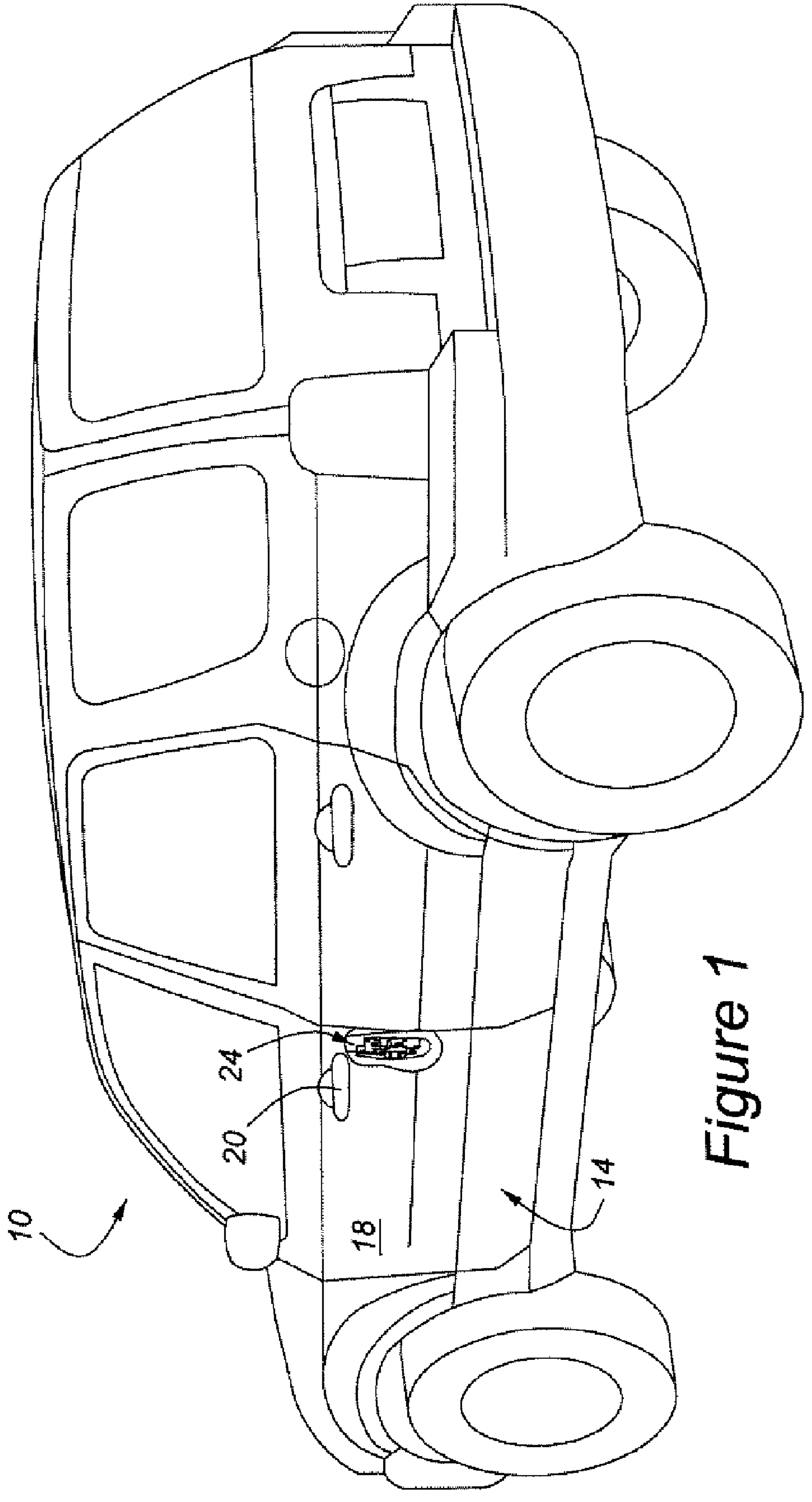
FIG. 1 is a perspective view of a vehicle having a door latch system according to the present invention.

In the following figures the same reference numerals will be used to illustrate the same components.

As shown in FIG. 1, vehicle 10 has door 14 with door outer panel 18, and an outside release handle 20. Latch assembly 24 is mounted in the end 19 of door 14. Those skilled in the art will appreciate that the present invention could be employed with many types of inside release handles as well.

Figure 2:
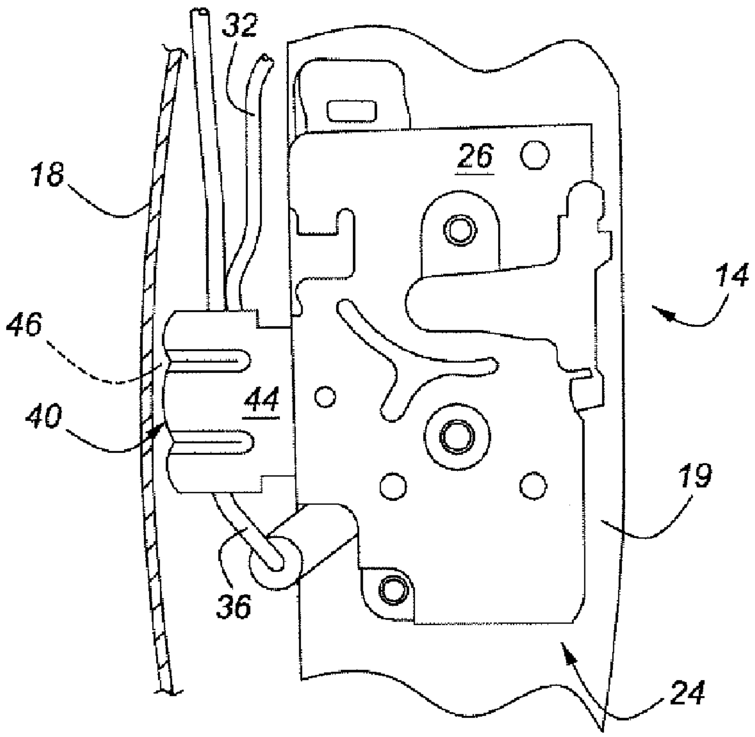
FIG. 2 is a segment end view of a door having a latch system according to the present invention.
Figure 3:
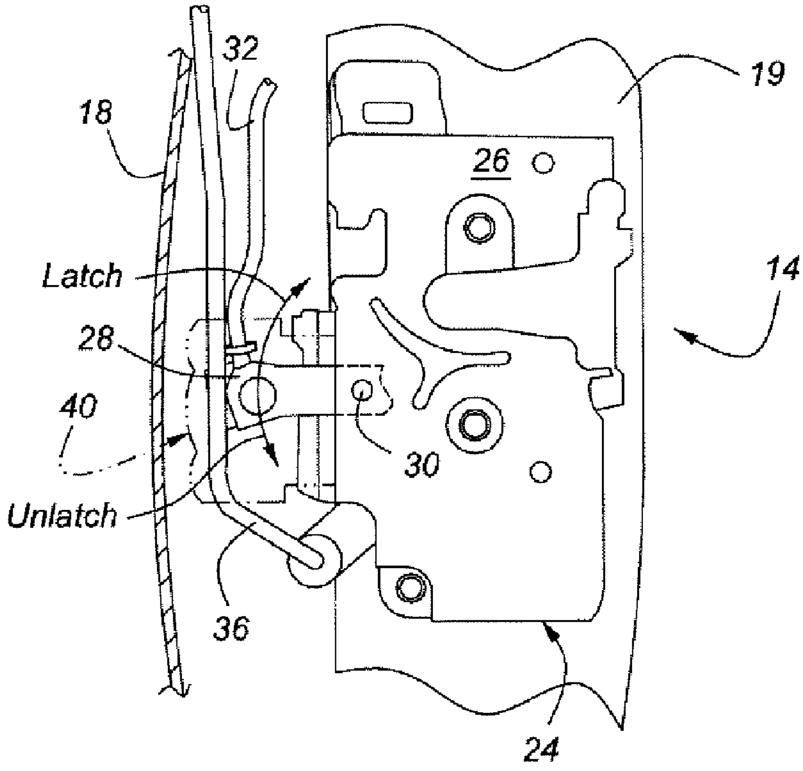
FIG. 3 is similar to FIG. 2 but shows a release lever immobilizer bracket in a ghost view so as to permit a clear view of a release lever and release rod suitable for use with a latch system according to the present invention.

FIGS. 2 and 3 are similar, but differ in that FIG. 2 shows complete latch assembly 24, at least insofar as the present invention is concerned, whereas FIG. 3 is cut away to show hidden details. As shown in FIGS. 2 and 3, latch assembly 24 having a housing 26 is operated, as far as latching and unlatching is concerned, by release lever 28 (FIG. 3). Release lever 28 is driven by release rod 32, which can be attached to either outside release handle 20, or to an inside release handle (not shown). Lock rod 36 extends from a key lock cylinder (not shown) down to latch assembly 24.

Figure 5:
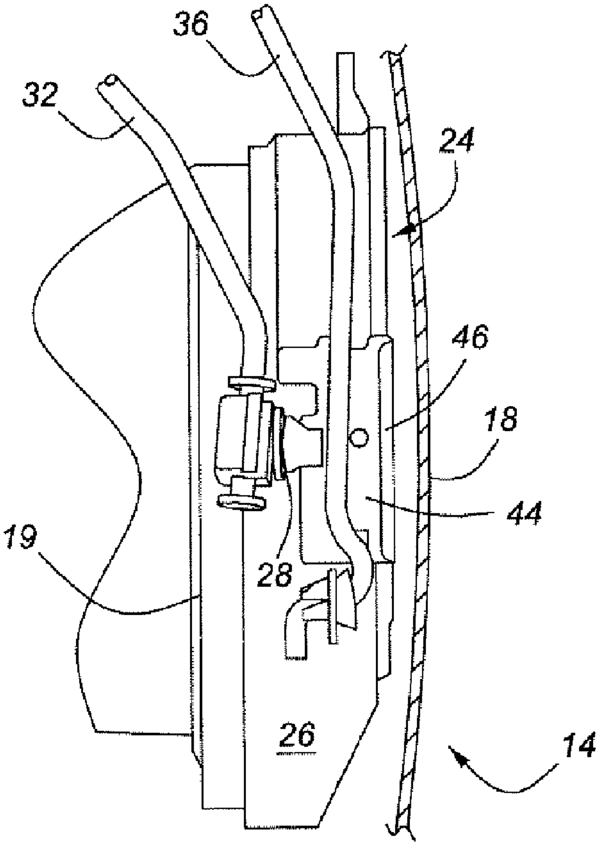
FIG. 5 illustrates a view from inside a door looking out at a latch system according to the present invention in an undeformed state.

As shown in FIGS. 2, 3, and 5, release lever immobilizer bracket 40 is a formed member having a first portion 44 attached to latch housing 26, and a second portion, 46, which extends outboard from latch housing 26. Immobilizer bracket 40 may be attached to latch housing 26 by welding, by adhesive bonding, by mechanical fasteners, or by other suitable means known to those skilled in the art and suggested by this disclosure.

Figure 4:
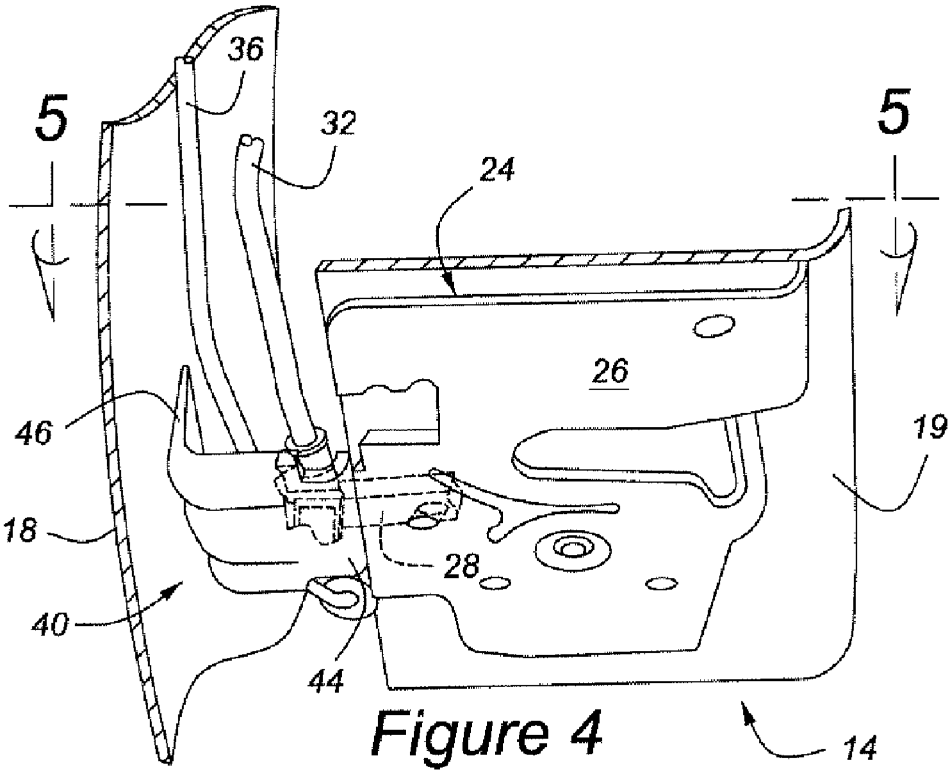
FIG. 4 is similar to FIGS. 2 and 3 but is elevated so as to show a perspective of the latch system according to the present invention.

Second portion 46 of release lever immobilizer bracket 40 includes, as shown in FIGS. 4 and 5, a generally planar segment which overlies release rod 32 and release lever 28 when latch 24 is in its normal operating condition. While in this configuration, planar segment 46 is generally parallel to door outer panel 18 in the region of latch 24. As shown in FIG. 3, release lever 28 swings in an arc labeled L to U, where L refers to the latched position, and U refers to the unlatched position.

FIGS. 4 and 5 show latch 24 and especially, the position of release lever immobilizer bracket 40 and planar portion 46 before an impact against outer panel 18.

Figure 6:
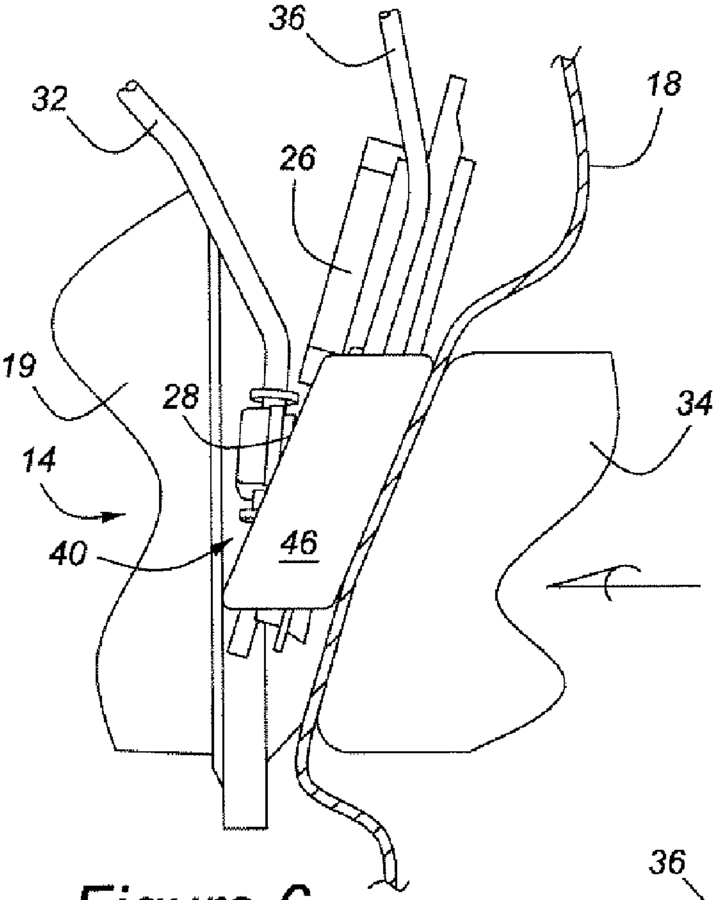
FIG. 6 is similar to FIG. 5 but shows a latch system of the present invention having been impacted by a collision event.

FIG. 6 shows the present latch system after a striking object, 34, has impacted upon outer panel 18. Immobilizer bracket 40 is shown as being pushed inboard and tipped and plastically deformed by outer panel 18 and striking object 34 so that downward movement of release lever 28 and, for that matter, release rod 32, are blocked by planar segment 46. In essence, an impact directed against outer panel 18 in the region of latch 24 having sufficient energy and force to deform outer panel 18 will cause bracket 40 to deform plastically to a degree sufficient to perform its blocking function. If release lever 28 is prevented from moving downwardly, latch 24 cannot unlatch, and door 14 will be urged to remain closed.

Figure 7:
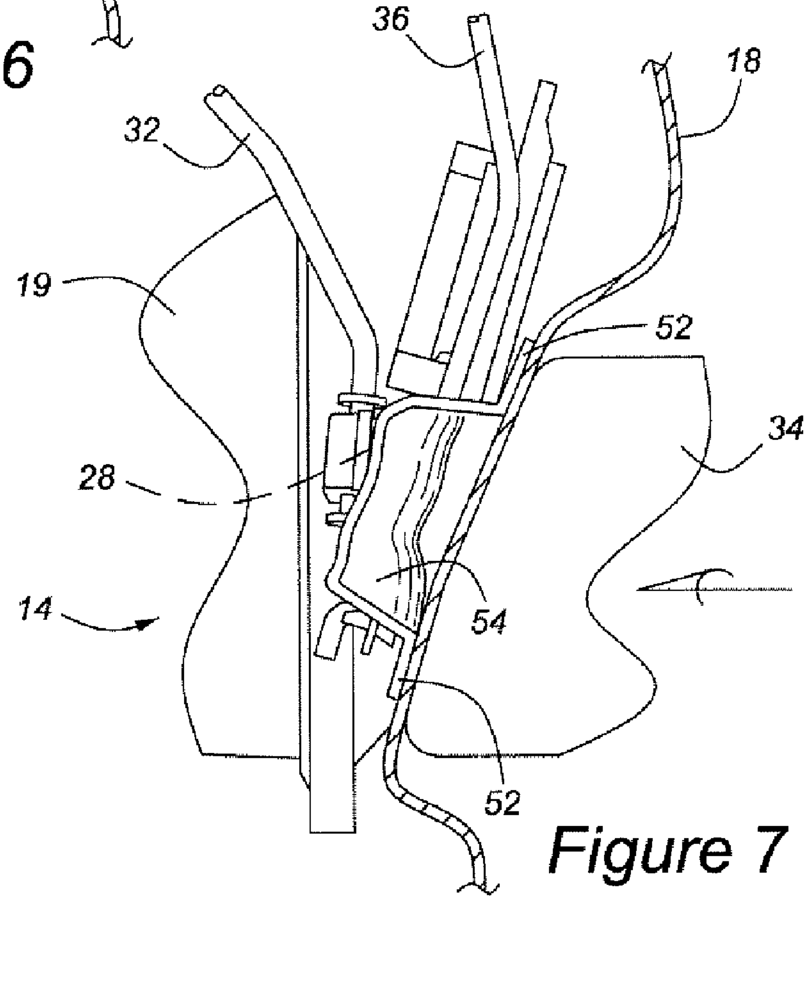
FIG. 7 is similar to FIG. 6 but shows an alternative impact-responsive release lever immobilizer according to the present invention, in an impacted state.

In the embodiment of FIG. 7, immobilizer bracket 54 is attached by means of integral tabs 52 to outer panel 18. As with the earlier configuration, an impact having sufficient severity to deform outer panel 18 so that latch 24 is contacted will cause bracket 54 to deform plastically and prevent movement of release lever 28. The embodiment of FIG. 7 may be useful for certain door configurations in which it is not feasible to mount an immobilizer bracket upon latch housing 26.

The present method for preventing undesired impact-related release of an automotive door latch includes the steps of providing the present latch release lever and release rod, but more importantly, providing the present immobilizer bracket mounted within a vehicle door and extending between the release lever 28 and outer panel 18 such that an impact directed against outer panel 18 in the region of latch 24 sufficient to deform outer panel 18 will cause outer panel 18 to deform bracket 40 so as to block movement of release lever 28 into its unlatched position.

While particular embodiments of the invention have been shown and described, numerous variations and alternate embodiments will occur to those skilled in the art. Accordingly, it is intended that the invention be limited only in terms of the appended claims.

What is claimed is:

1. A door latch system for an automotive vehicle, comprising:
- a door having an inner panel and an outer panel;
- a latch having a housing mounted to said inner panel, and a release lever;
- a release rod, operatively connected with said release lever, for opening said latch; and
- an impact-responsive release lever immobilizer mounted within said door.

2. A door latch system according to claim 1, wherein said immobilizer comprises a bracket fastened to said latch housing and extending between said release rod and said outer panel of said door such that deformation of the outer panel in the region of said latch sufficient to cause the outer panel to contact the latch will cause deformation of the bracket, thereby blocking movement of the release lever.

3. A door latch system according to claim 2, wherein said bracket comprises a formed member.

4. A door latch system according to claim 1, wherein said immobilizer comprises a first bracket portion fastened to said latch housing and a second bracket portion extending from the first portion and overlying said release rod and release lever such that an impact directed against the latch in the region of said release lever will cause said second bracket portion to deform so as to block movement of the release lever.

5. A door latch system according to claim 2, wherein said bracket comprises a formed member welded to said latch housing and having a generally planar segment overlying said release rod and said release lever.

6. A door latch system according to claim 1, wherein said immobilizer comprises a bracket applied to said outer panel and overlying said release lever such that an impact directed against said outer panel in the region of said latch sufficient to deform the outer panel will cause the bracket to contact the release lever so as to block movement of the release lever.

7. A door for an automotive vehicle, comprising:
- an inner panel;
- an outer panel;
- a latch having a housing mounted to said inner panel;
- a release lever pivoted to said latch housing;
- a release rod extending from a manually actuatable handle to said release lever; and
- an impact-responsive release lever immobilizer bracket extending between said release lever and said outer panel such that a collision impact directed against said outer panel in the region of said latch having sufficient severity to deform the outer panel will cause the immobilizer bracket to deform plastically so as to block movement of the release lever.

8. A method for avoiding an impact-related release of an automotive door latch, comprising the steps of:

providing a latch having a housing mounted between inner and outer panels of a door;

providing a latch release lever pivotably mounted to said latch housing and having a path extending from a latched position to an unlatched position;

providing a release rod attached to said latch release lever; and providing an immobilizer bracket mounted within the door and extending between the release lever and the outer panel of the door such that an impact directed against the outer panel in the region of the latch sufficient to deform the outer panel will cause the outer panel to deform the bracket so as to block movement of the release lever into the unlatched position.

9. The method of claim 8, wherein said immobilizer bracket blocks movement of the release lever by moving into the path the release lever must traverse in order to move from the latched position to the unlatched position.

10. The method of claim 8, wherein said immobilizer bracket is mounted to said latch housing.

11. The method of claim 8, wherein said immobilizer bracket is mounted to said outer panel of said door.

* * * * *